US010552033B2

(12) United States Patent
Shigemitsu

(10) Patent No.: US 10,552,033 B2
(45) Date of Patent: Feb. 4, 2020

(54) CONTROL DEVICE, METHOD OF CONTROLLING ELECTRONIC APPARATUS, AND RECORDING MEDIUM

(71) Applicant: SEIKO EPSON CORPORATION, Tokyo (JP)

(72) Inventor: Makoto Shigemitsu, Sapporo (JP)

(73) Assignee: SEIKO EPSON CORPORATION, Tokyo (JP)

(*) Notice: Subject to any disclaimer, the term of this patent is extended or adjusted under 35 U.S.C. 154(b) by 57 days.

(21) Appl. No.: 15/556,799

(22) PCT Filed: Feb. 18, 2016

(86) PCT No.: PCT/JP2016/000880
§ 371 (c)(1),
(2) Date: Sep. 8, 2017

(87) PCT Pub. No.: WO2016/147557
PCT Pub. Date: Sep. 22, 2016

(65) Prior Publication Data
US 2018/0059927 A1    Mar. 1, 2018

(30) Foreign Application Priority Data
Mar. 19, 2015   (JP) .................................. 2015-056780

(51) Int. Cl.
*G06F 3/048*    (2013.01)
*G06F 3/0488*   (2013.01)
(Continued)

(52) U.S. Cl.
CPC ........ *G06F 3/04883* (2013.01); *G06F 3/0482* (2013.01); *G06F 3/0485* (2013.01); *G06F 3/04842* (2013.01)

(58) Field of Classification Search
CPC ............... G06F 3/04883; G06F 3/0482; G06F 3/04842; G06F 3/0485
(Continued)

(56) References Cited

U.S. PATENT DOCUMENTS 9,600,114 B2 *   3/2017   Milam ................... G06F 3/0414
9,600,116 B2 *   3/2017   Tao ........................ G06F 3/0414
(Continued)

FOREIGN PATENT DOCUMENTS

JP    2012-253716 A    12/2012
JP    2013-077239 A    4/2013
(Continued)

OTHER PUBLICATIONS

Mar. 15, 2016 International Search Report issued in Patent Application No. PCT/JP2016/000880.

*Primary Examiner* — David Phantana-angkool
(74) *Attorney, Agent, or Firm* — Oliff PLC

(57) ABSTRACT

A control device adapted to control an electronic apparatus includes a position detection section adapted to repeatedly detect a position on an operation area pointed with a pointer, a moving velocity identification section adapted to identify a moving velocity of the pointer based on the plurality of positions detected, and a command transmission section adapted to transmit a predetermined command used to control the electronic apparatus to the electronic apparatus at a frequency corresponding to the moving velocity identified.

13 Claims, 9 Drawing Sheets

(51) Int. Cl.
*G06F 3/0482* (2013.01)
*G06F 3/0484* (2013.01)
*G06F 3/0485* (2013.01)

(58) Field of Classification Search
USPC .......................................................... 715/810
See application file for complete search history.

(56) References Cited

U.S. PATENT DOCUMENTS

| | | |
|---|---|---|
| 9,990,121 B2 * | 6/2018 | Cieplinski ............ G06F 3/04855 |
| 9,996,231 B2 * | 6/2018 | Missig ................ G06F 3/04842 |
| 10,042,515 B2 * | 8/2018 | Kumagai .............. G06F 3/0482 |
| 2008/0062140 A1 * | 3/2008 | Hotelling ............. G09G 3/3648 |
| | | 345/173 |
| 2013/0097564 A1 * | 4/2013 | Morikawa ........... G06F 3/04886 |
| | | 715/856 |
| 2013/0282117 A1 * | 10/2013 | Van Heugten ............ A61F 2/14 |
| | | 623/6.22 |
| 2015/0040060 A1 * | 2/2015 | Urakawa ............. G06F 3/04883 |
| | | 715/787 |
| 2018/0059927 A1 * | 3/2018 | Shigemitsu ........... G06F 3/0482 |
| 2018/0335921 A1 * | 11/2018 | Karunamuni ......... G06F 3/0488 |
| 2019/0133689 A1 * | 5/2019 | Johnson .................... G09B 9/00 |
| 2019/0254629 A1 * | 8/2019 | Li ............................ A61B 8/14 |
| 2019/0265802 A1 * | 8/2019 | Parshionikar ........... G06F 3/012 |

FOREIGN PATENT DOCUMENTS

| | | |
|---|---|---|
| JP | 2015-032132 A | 2/2015 |
| JP | 5683764 B1 | 3/2015 |
| WO | 2016-021049 A1 | 2/2016 |

* cited by examiner

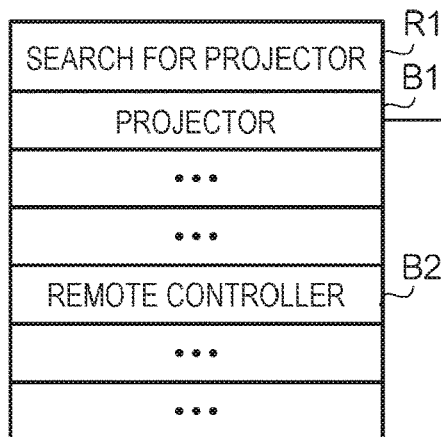
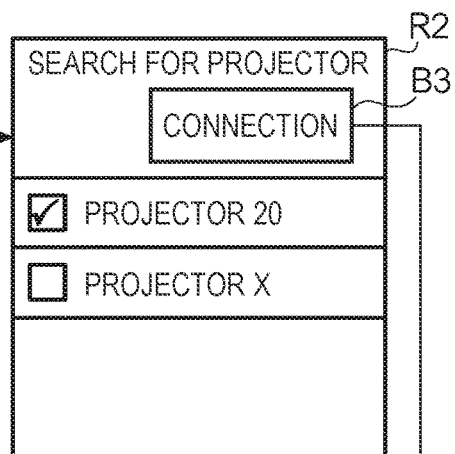
FIG. 5A  FIG. 5B
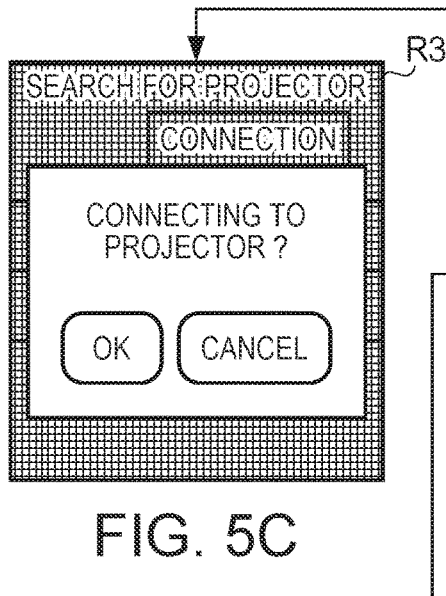
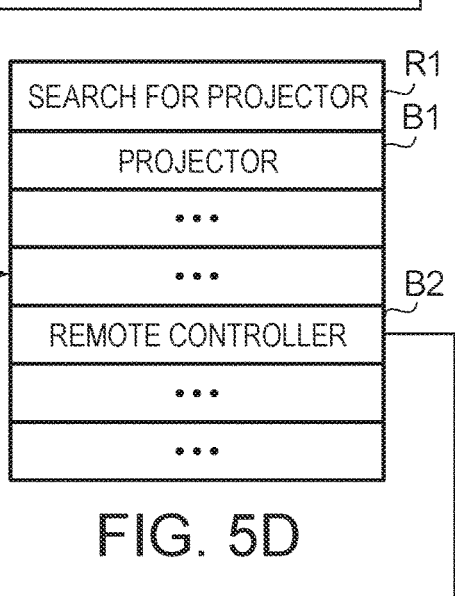
FIG. 5C  FIG. 5D
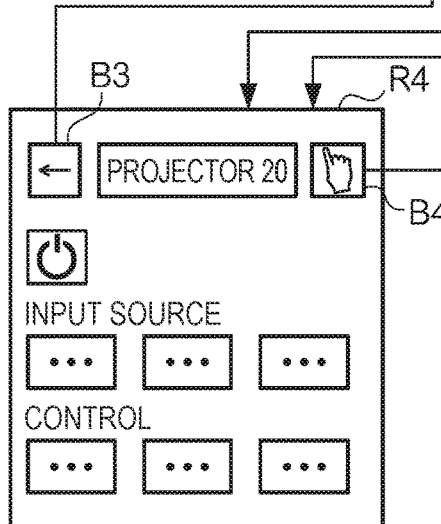
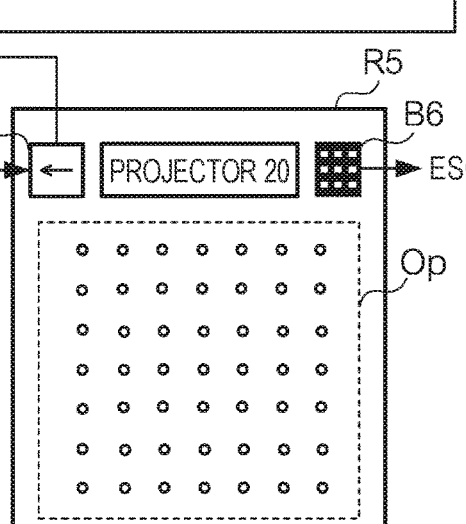
FIG. 5E  FIG. 5F

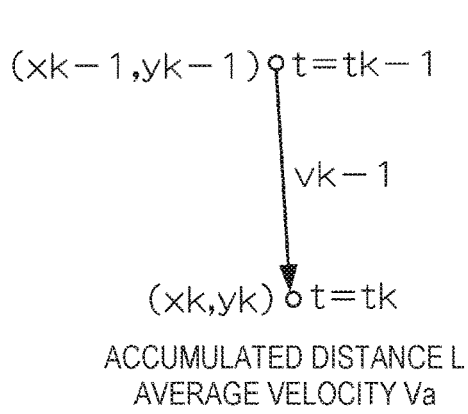
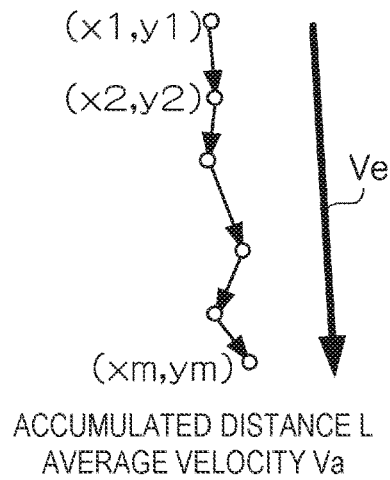

FIG.10A  FIG.10B

| MOVING DIRECTION | AVERAGE VELOCITY Va | ACCUMULATED DISTANCE L | COMMAND |
|---|---|---|---|
| VERTICAL DIRECTION | — | LOWER THAN DISTANCE THRESHOLD VALUE Dth1 | NONE |
| | LOWER THAN VELOCITY THRESHOLD VALUE Vth | EQUAL TO OR LONGER THAN DISTANCE THRESHOLD VALUE Dth2 | DIRECTION INDICATION COMMAND, ONCE |
| | LOWER THAN VELOCITY THRESHOLD VALUE Vth | LOWER THAN DISTANCE THRESHOLD VALUE Dth2 | NONE |
| | EQUAL TO OR HIGHER THAN VELOCITY THRESHOLD VALUE Vth | EQUAL TO OR LONGER THAN DISTANCE THRESHOLD VALUE Dth1 | DIRECTION INDICATION COMMAND, TWICE |
| RIGHTWARD DIRECTION | — | — | DETERMINATION INSTRUCTION COMMAND, ONCE |

FIG.11

FIG.13A
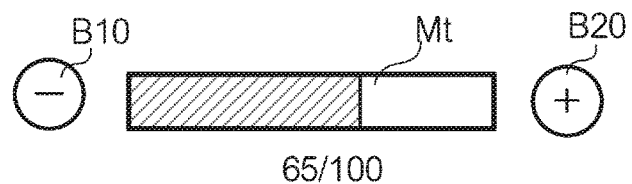
FIG.13B
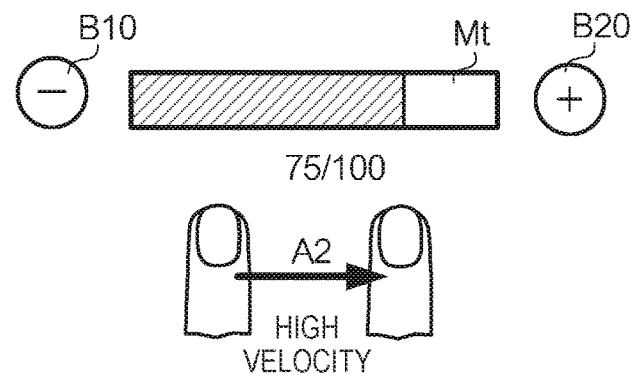
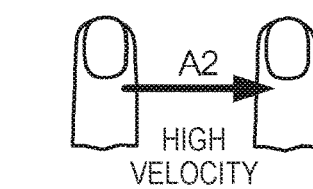
FIG.13C
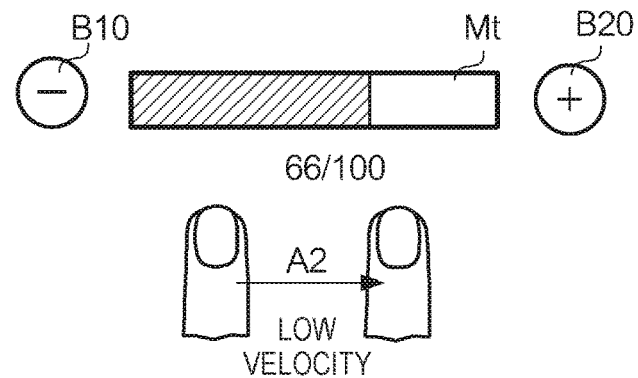
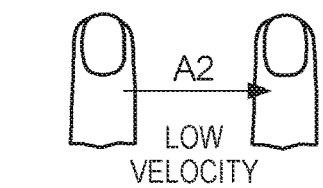
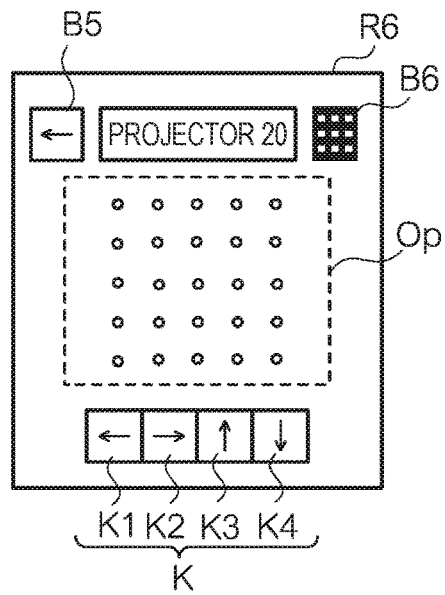
FIG.14

CONTROL DEVICE, METHOD OF CONTROLLING ELECTRONIC APPARATUS, AND RECORDING MEDIUM

TECHNICAL FIELD

The present invention relates to a technology for controlling an electronic apparatus based on a command for controlling the electronic apparatus.

BACKGROUND ART

In the past, there has been known a method of performing a menu operation of an electronic apparatus for control and setting of the electronic apparatus using an operation key installed in a main body of the electronic apparatus or a remote controller. PTL 1 discloses a technology for displaying a picture imitating remote control keys, or controlling the electronic apparatus using a gesture input in order to use a portable terminal with a touch panel such as a smartphone instead of a remote controller of the electronic apparatus.

CITATION LIST

Patent Literature

PTL 1: JP-A-2012-253716

SUMMARY OF INVENTION

Technical Problem

In the related art technology, in the case of performing the menu operation while looking at the menu displayed by the electronic apparatus, it is necessary to touch the key displayed on the touch panel, and therefore, there is a problem that it is difficult to perform an accurate key operation unless the operator looks at both of the menu displayed by the electronic apparatus and the touch panel. In particular in the case of performing the same key input such as translation of the menu items in a row, it is required to touch the key on the touch panel over and over again, and it is difficult to perform the operation without looking at the touch panel. Further, in the case of the gesture input, although it is not necessarily required to look at the touch panel for the operation, it is necessary for the electronic apparatus to recognize a command by the gesture input, and therefore, it is necessary to newly add the command corresponding to the gesture input to the electronic apparatus side. Therefore, there is a problem that the development takes long time, and increases in cost.

The invention has been made in view of the circumstances described above, and one of the objects of the invention is to improve the operability in the case of controlling the electronic apparatus in accordance with an operation of moving a pointer on an operation area of a touch panel.

Solution to Problem

In order to achieve the above object, a control device according to the invention is a control device adapted to control an electronic apparatus including a position detection section adapted to repeatedly detect a position on an operation area pointed with a pointer, a moving velocity identification section adapted to identify a moving velocity of the pointer based on the plurality of positions detected, and a command transmission section adapted to transmit a predetermined command used to control the electronic apparatus to the electronic apparatus at a frequency corresponding to the moving velocity identified.

According to the invention, since the command is transmitted to the electronic apparatus at the frequency corresponding to the moving velocity of the pointer on the operation area, the operability in the case of transmitting the command for controlling the electronic apparatus in accordance with the operation for moving the pointer on the operation area can be improved.

In the invention, the control device may further include a moving distance identification section adapted to identify a moving distance of the pointer based on the positions detected, and the command transmission section may transmit the command at a frequency corresponding to the moving velocity identified and the moving distance identified.

According to the invention with this configuration, since the command is transmitted to the electronic apparatus at the frequency corresponding to the moving velocity and the moving distance of the pointer on the operation area, the operability in the case of transmitting the command for controlling the electronic apparatus in accordance with the operation for moving the pointer on the operation area can be improved.

In the invention, the command transmission section may transmit the command again in a case in which the moving distance accumulated from when transmitting one of the commands is equal to or longer than a threshold value.

According to the invention with this configuration, since the next command is transmitted in the case in which the accumulated moving distance after transmitting one command is equal to or longer than the threshold value, it is easy for the user to figure out the fact that the intended control has been performed.

In the invention, the frequency may be set higher in a case in which the moving velocity is higher than a first velocity compared to a case in which the moving velocity is lower than the first velocity.

According to the invention with this configuration, it is possible for the user to perform the operation with the increased frequency of the transmission of the command by increasing the moving velocity of the pointer.

In the invention, the frequency may be set lower in a case in which the moving velocity is lower than a second velocity compared to a case in which the moving velocity is higher than the second velocity.

According to the invention with this configuration, it is possible for the user to perform the operation with the decreased frequency of the transmission of the command by decreasing the moving velocity of the pointer.

In the invention, the control device may further include a moving direction identification section adapted to identify a moving direction of the pointer based on the plurality of positions detected, and the command transmission section may transmit the command of a type corresponding to the moving direction identified.

According to the invention with this configuration, the type of the command can be made different in accordance with the moving direction of the pointer.

In the invention, the command transmission section may transmit the command of indicating the direction corresponding to the moving direction identified.

According to the invention with this configuration, it is easy for the user to intuitively perform the operation of indicating the direction.

In the invention, the operation area may be separately disposed from an area where an operator used to control the electronic apparatus is disposed.

According to the invention with this configuration, it is possible for the user to selectively use the operation using the operation area and the operation using the operator.

A method of controlling an electronic apparatus according to the invention includes a step of identifying a moving velocity of a pointer, when a plurality of positions on an operation area pointed with the pointer is supplied, based on the plurality of positions supplied, and a step of transmitting a predetermined command used to control the electronic apparatus to the electronic apparatus at a frequency corresponding to the moving velocity identified.

According to the invention, since the command is transmitted to the electronic apparatus at the frequency corresponding to the moving velocity of the pointer on the operation area, the operability in the case of transmitting the command for controlling the electronic apparatus in accordance with the operation for moving the pointer on the operation area can be improved.

A recording medium according to the invention is a computer-readable recording medium storing a program which can be executed by a computer, the program making the computer execute a process including the steps of identifying a moving velocity of a pointer, when a plurality of positions on an operation area pointed with the pointer and detected repeatedly is supplied, based on the plurality of positions supplied, and transmitting a predetermined command used to control the electronic apparatus to the electronic apparatus at a frequency corresponding to the moving velocity identified.

According to the invention, since the command is transmitted to the electronic apparatus at the frequency corresponding to the moving velocity of the pointer on the operation area, the operability in the case of transmitting the command for controlling the electronic apparatus in accordance with the operation for moving the pointer on the operation area can be improved.

A control device according to the invention is a control device adapted to control an electronic apparatus including a position detection section adapted to repeatedly detect a position on an operation area pointed with a pointer, a moving distance identification section adapted to identify a moving distance of the pointer based on the plurality of positions detected, and a command transmission section adapted to transmit a predetermined command used to control the electronic apparatus in accordance with the moving distance identified to the electronic apparatus, and the command transmission section transmits the command again in a case in which the moving distance accumulated from when transmitting one of the commands is equal to or longer than a threshold value.

According to the invention, since the command is transmitted every time the accumulated value of the moving distance of the pointer on the operation area becomes equal to or longer than the threshold value, the command can be transmitted in series.

BRIEF DESCRIPTION OF DRAWINGS

FIG. 5 is a diagram showing transition of a picture displayed based on the operation application according to the embodiment.

FIG. 10 is an explanatory diagrams of a method of identifying a moving velocity and a moving distance according to the embodiment.

FIG. 11 is an explanatory diagram of an example of a relationship between the content of swipe and a command to be transmitted according to the embodiment.

FIG. 13 is an explanatory diagram of the command transmission process according to a modified example of the embodiment of the invention.

FIG. 14 is an explanatory diagram showing an example of a picture displayed by a control device according to a modified example according to the embodiment of the invention.

DESCRIPTION OF EMBODIMENTS

An embodiment of the invention will hereinafter be explained with reference to the accompanying drawings.

Figure 1:
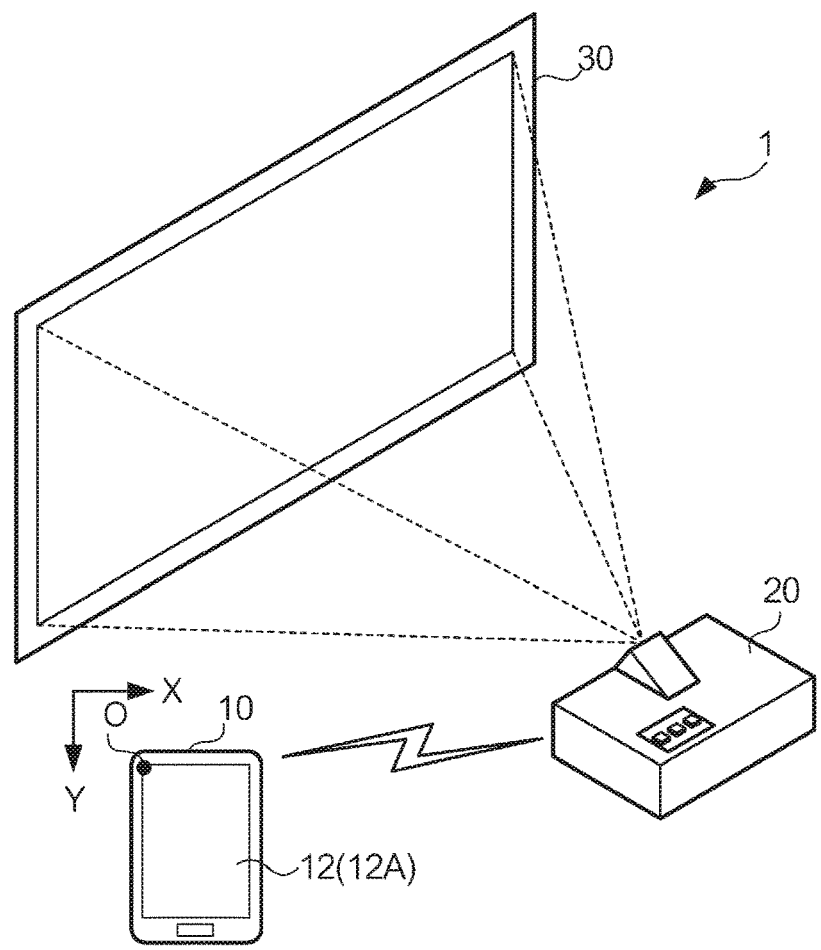
FIG. 1 is a diagram showing an overall configuration of a display system according to an embodiment of the invention.

FIG. 1 is a diagram showing an overall configuration of a display system 1 according to an embodiment of the invention. As shown in FIG. 1, the display system 1 is provided with a control device 10 and a projector 20. The control device 10 functions as a remote controller for controlling the projector 20 with a remote operation. The control device 10 is provided with a touch panel 12 for detecting an operation by the user. The touch panel 12 detects, for example, a tap operation of touching the touch panel 12 with a finger, and a swipe operation of moving (sliding) the finger while keeping the finger having contact with the touch panel 12. The control device 10 is a smartphone in the present embodiment, but can also be a device such as a tablet type computer or a PDA (Personal Digital Assistant).

The projector 20 corresponds to an electronic apparatus to be controlled by the control device 10. The projector 20 is, for example, a liquid crystal projector, and is a projection display device for projecting an image on a screen 30. The projector 20 projects a color image on the screen 30 based on, for example, image signals corresponding respectively to color components of the three primary colors of R (Red), G (Green), and B (blue). Due to the projection of the image, a picture is displayed on the screen 30. The screen 30 here is a reflective screen, and is a projection surface on which the image is projected by the projector 20.

It should be noted that the projector 20 can also be a projector adopting a reflective liquid crystal panel, a digital micromirror device (DMD), or the like.

The projector 20 is provided with an operation panel. By holding down a key of the operation panel, it is possible to display a setup menu to thereby make it possible to perform operations and setup of the projector 20. For example, in order to select the translation of the items of the setup menu or to select the items thereof, a direction indication key and a determination key are used.

Further, the projector 20 is provided with an existing remote controller using physical keys, and infrared communication. The keys provided to the existing remote controller have the same functions as those of the keys of the operation panel of the projector 20. That is, the command to be transmitted in the case in which the key provided to the existing remote controller is held down is the same as the commend issued inside in the case in which the key having the same function of the operation panel provided to the projector 20.

Figure 2:
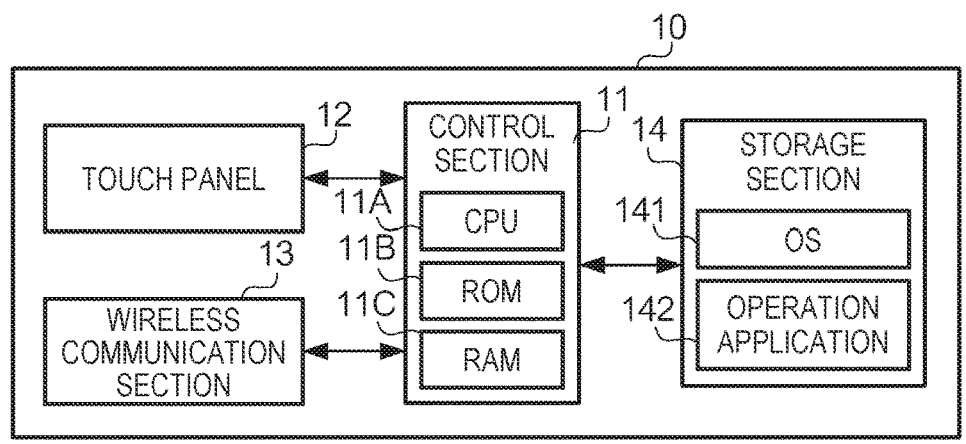
FIG. 2 is a block diagram showing a hardware configuration of a control device according to the embodiment.

FIG. 2 is a diagram showing a hardware configuration of the control device 10. As shown in FIG. 2, the control device 10 is provided with a control section 11, a touch panel 12, a wireless communication section 13, and a storage section 14.

The control section 11 is a processor provided with a CPU (Central Processing Unit) 11A as an arithmetic processing device, a ROM (Read Only Memory) 11B, and a RAM (Random Access Memory) 11C. The CPU 11A reads out a program, which is stored in the ROM 11B or the storage section 14, in the RAM 11C, and then executes the program to thereby control each section of the control device 10.

The touch panel 12 is provided with a display section such as a liquid crystal display, and a touch sensor disposed so as to have a sheet-like shape and overlap a display surface 12A of the display section. The display surface 12A is a rectangular display surface. The touch panel 12 displays a picture such as a character or a GUI (Graphical User Interface). The touch panel 12 repeatedly detects the position on the display surface 12A pointed with a finger of the user, and then supplies the CPU 11A with a signal corresponding to the position thus detected. In other words, the touch panel 12 corresponds to a position detection section. It is also possible for the touch panel 12 to detect the position pointed with a device such as a stylus pen instead of the finger of the user. The CPU 11A obtains the coordinate of the position pointed by the finger of the user based on a signal supplied from the touch panel 12. As shown in FIG. 1, the CPU 11A obtains the coordinate (x, y) in an X axis extending along a short side of the display surface 12A and a Y axis extending along a long side thereof using an upper left corner point of the display surface 12A as an origin O.

The wireless communication section 13 is provided with, for example, a wireless communication circuit and an antenna, and performs wireless communication with an external electronic apparatus. The wireless communication section 13 performs wireless communication compliant with the standard of IEEE802.11 (Wi-Fi: registered trademark) in the present embodiment, but can also perform wireless communication (e.g., infrared communication, Bluetooth (registered trademark)) compliant with other standards.

The storage section 14 is provided with, for example, a nonvolatile semiconductor memory, and stores a program executed by the control section 11 and other data. As the program, there can be cited an OS (Operating System) 141, and an operation application 142 operating on the OS 141. The OS 141 detects an operation event for identifying an operation having been performed using a surface of the touch panel 12. As the operation event, there can be cited a touch event representing the fact that the finger of the user has had contact, and a move event representing the fact that the finger of the user has moved while having contact. The tap described above is identified by the touch event, and the swipe is identified by the move event. The operation application 142 is an application program for functioning the control device 10 as the remote controller for the projector 20.

Figure 3:
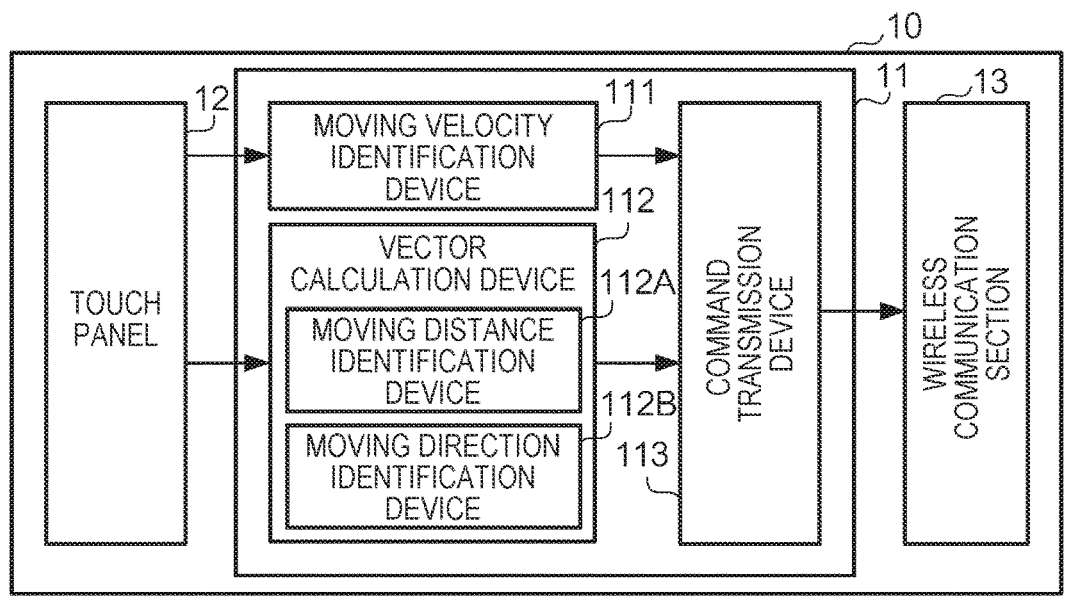
FIG. 3 is a block diagram showing a functional configuration of the control device according to the embodiment.

FIG. 3 is a block diagram showing a functional configuration of the CPU 11A of the control device 10. The CPU 11A realizes the functions corresponding to a moving velocity identification section 111, a vector calculation section 112, and a command transmission section 113 based on the operation application 142.

The moving velocity identification section 111 is a section adapted to identify the moving velocity of the finger in the swipe operation based on a plurality of positions on the touch panel 12 pointed with the finger of the user.

The vector calculation section 112 is a section adapted to calculate a vector identifying the swipe operation performed with the finger of the user. The vector is identified by a combination of the moving distance and the moving direction of the finger. Therefore, it results that the vector calculation section 112 includes the functions corresponding to a moving distance identification section 112A for identifying the moving distance of the finger, and a moving direction identification section 112B for identifying the moving direction of the finger based on the position thus detected.

The command transmission section 113 is a section adapted to transmit a command for controlling the projector 20 to the projector 20 via the wireless communication section 13. The command transmission section 113 transmits a predetermined command at a frequency corresponding to the moving velocity identified by the moving velocity identification section 111 and the vector (i.e., moving distance and the moving direction of the finger) calculated by the vector calculation section 112. As the command, there can be cited a direction indication command for indicating the direction. The direction indication command is a command corresponding to holding down of the direction indication key on the operation panel of the projector 20. As another command, there can be cited a determination instruction command for instructing determination of the process. The determination instruction command is a command corresponding to holding down of the determination key on the operation panel of the projector 20. The frequency of transmission of the command represents the number of times of the transmission of the command for instructing predetermined control to the projector 20. The frequency of the transmission of the command can also be said to be a degree of repetition of the command transmission.

Figure 4:
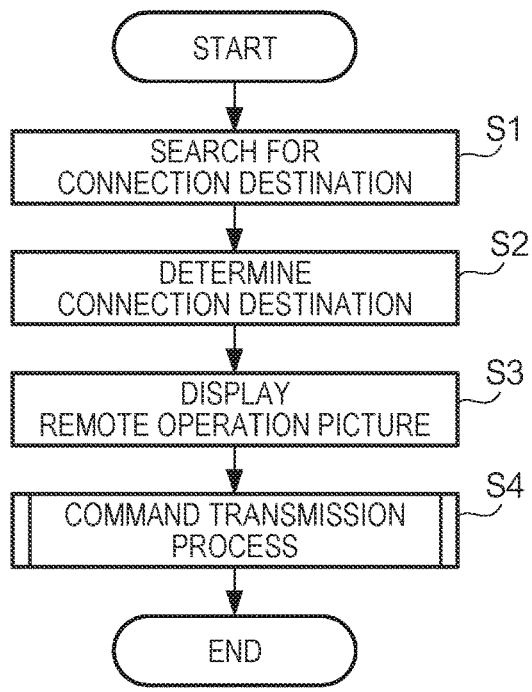
FIG. 4 is a flowchart showing a flow of an overall process performed based on an operation application according to the embodiment.

FIG. 4 is a flowchart showing a flow of an overall process performed based on the operation application 142 in the CPU 11A. FIG. 5 is a diagram showing transition of a picture displayed based on the operation application 142.

Firstly, in the CPU 11A, the operation application 142 searches for (step S1) a connection destination. The connection destination denotes a projector to be a target of a remote operation. The operation application 142 displays a picture R1 shown in FIG. 5(A) using the touch panel 12. When the tap operation to an operator image B1 described as "PROJECTOR" is detected, the operation application 142 makes the transition to a display of a picture R2 showing a list of connectable projectors as shown in FIG. 5(B).

Then, the operation application 142 determines the connection destination (step S2). The operation application 142 makes the transition to a display of a picture R3 shown in FIG. 5(C) when the tap operation to an operator image B3 described as "CONNECTION" is detected in the state in which a checkbox corresponding to "PROJECTOR 20" is selected in the picture R2 shown in FIG. 5(B). The operation application 142 determines the projector 20 as the connection destination in the case in which the tap operation to an operator image described as "OK" is detected. In the case in which the tap operation to an operator image described as "CANCEL" is detected, the operation application 142 restores the display of the picture R2 (FIG. 5(B)).

Then, the operation application 142 displays a remote operation picture using the touch panel 12 (step S3). The operation application 142 makes the transition to a display of a picture R4 shown in FIG. 5(E) when the tap operation to an operator image B2 described as "REMOTE CONTROLLER" is detected in the picture R1 shown in FIG. 5(D). The picture R4 includes the operator image B3 for restoring the display of the previous picture, and an operator image B4 for making the transition to the remote operation picture. Besides the above, the picture R4 includes a plurality of operator images for controlling the projector 20. As the control, there can be cited switching ON/OFF of the power, selection of the input sources, and a type of the control. The operation application 142 makes the transition of the display to the remote operation picture R5 shown in FIG. 5(F) when the tap operation to the operator image B4 is detected.

The remote operation picture R5 includes an area in which an operator image B5 for restoring the display of the previous picture and an operator image B6 corresponding to an escape key for canceling the remote operation picture are disposed, and an operation area Op in which the swipe operation is detected. In the case in which the tap operation to the operator image B5 or B6 has been detected, the operation application 142 performs the process corresponding to the operator image on which the tap operation has been detected. In the case in which the swipe operation has been detected based on the touch event or the move event detected in the operation area Op, the operation application 142 performs the command transmission process (step S4). The command transmission process is a process for transmitting the commands for controlling the projector 20.

It should be noted that the images each showing "o" are arranged in a lattice manner in the operation area Op, and these images are displayed in order to make it easy for the user to figure out the length and the direction of the swipe operation. The content, and presence or absence of the images displayed in the operation area Op do not particularly matter.

FIG. 6 is a diagram for explaining a general outline of the command transmission process. FIG. 6(A) is a diagram showing a menu picture SC displayed by the projector 20. As shown in FIG. 6(A), the menu picture SC displays an item group I having items I1 through I8 arranged in a line in the vertical direction of the screen 30. The menu picture SC further displays a plurality of items associated with selected one of the items I1 through I8 in a menu area located on the right side of the item group I. In the example shown in FIG. 6(A), there is shown the menu area D1 having items I11 through I14 arranged in a line in the vertical direction of the screen 30 while selecting the item I1 indicated by a shaded section.

Figure 6A:
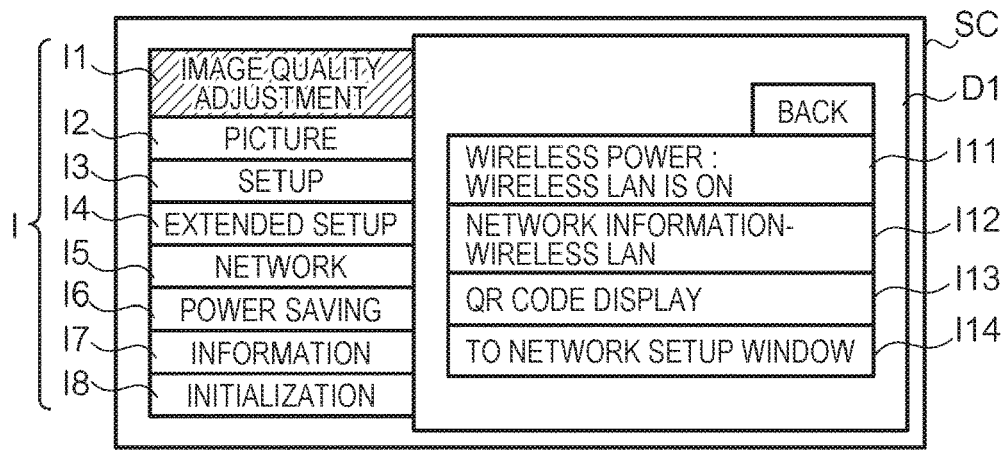
FIG. 6 is an explanatory diagram of a general outline of a command transmission process according to the embodiment.
Figure 6B:
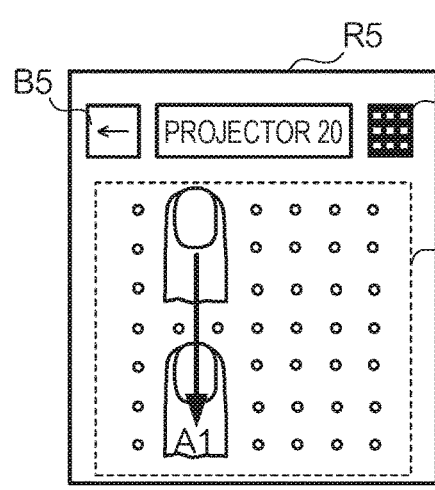

In the case of changing the item selected from the items I1 through I8, the user performs the swipe operation with a finger along a vertical direction (here, the arrow A1 direction as a downward direction) in the operation area Op of the remote operation picture R5 using the control device 10 (see FIG. 6(B)). The control device 10 issues a direction indication command corresponding to the swipe operation thus detected, and then transmits the direction indication command to the projector 20. Here, the direction, in which the items are arranged in the menu picture SC, and the direction, in which the swipe operation with the finger should be performed in order to change the item to be selected, are the same as each other. Specifically, the control device 10 transmits the direction indication command for indicating the downward direction in the case in which the swipe operation in the downward direction has been detected, and transmits the direction indication command indicating the upward direction in the case in which the swipe operation in the upward direction has been detected. One direction indication command is a command for changing the selection from selected one of the items to an item adjacent to the selected item. The projector 20 changes the item to be selected in the direction indicated by the direction indication command.

Figure 6C:
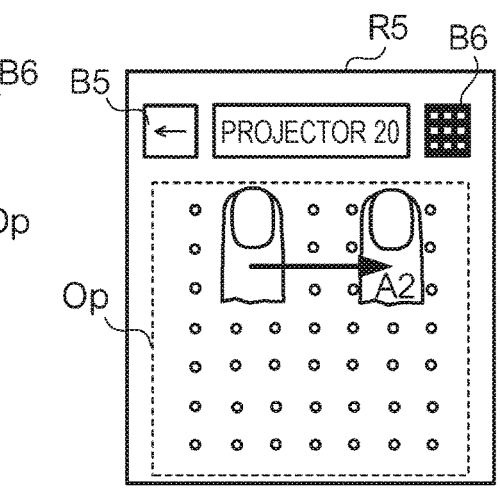

When the desired item has been selected, the user performs the swipe operation with the finger in the arrow A2 direction, which is the rightward direction, in the operation area Op (see FIG. 6(C)). When the control device 10 detects the swipe operation, the control device 10 issues the determination instruction command, and then transmits the determination instruction command to the projector 20. The projector 20 determines the selection of the item, which has been selected when the determination instruction command has been received. The projector 20 displays the menu area D1 or makes the state of selecting either one of the items in the menu area D1 in accordance with the determination instruction command.

It should be noted that in the operation area Op, the swipe operation with the finger of the user is performed in an oblique direction in some cases. In this case, it is advisable for the control device 10 to transmit the command corresponding to the nearest direction out of the vertical directions or the horizontal directions to the projector 20. Further, with respect to the selection and the determination of the item displayed in the menu area of the menu picture SC, the instruction is also performed by transmitting the command from the control device 10 to the projector 20 in accordance with the swipe operation similarly to the case of the item group I.

Figure 6D:
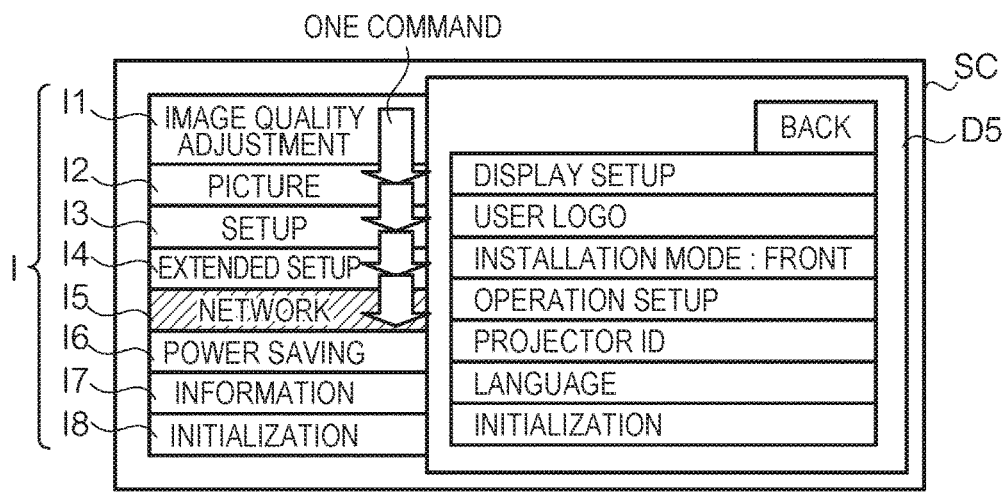

In the case of changing the selection from the item I1 to the item I5 as shown in FIG. 6(D), the control device 10 must transmit the direction indication command for indicating the downward direction four times to the projector 20 (see the outlined arrows in the drawing).

In order to improve the operability in the case of transmitting the command using the swipe operation, the control device 10 performs the command transmission process described below.

Figures 7, 8:
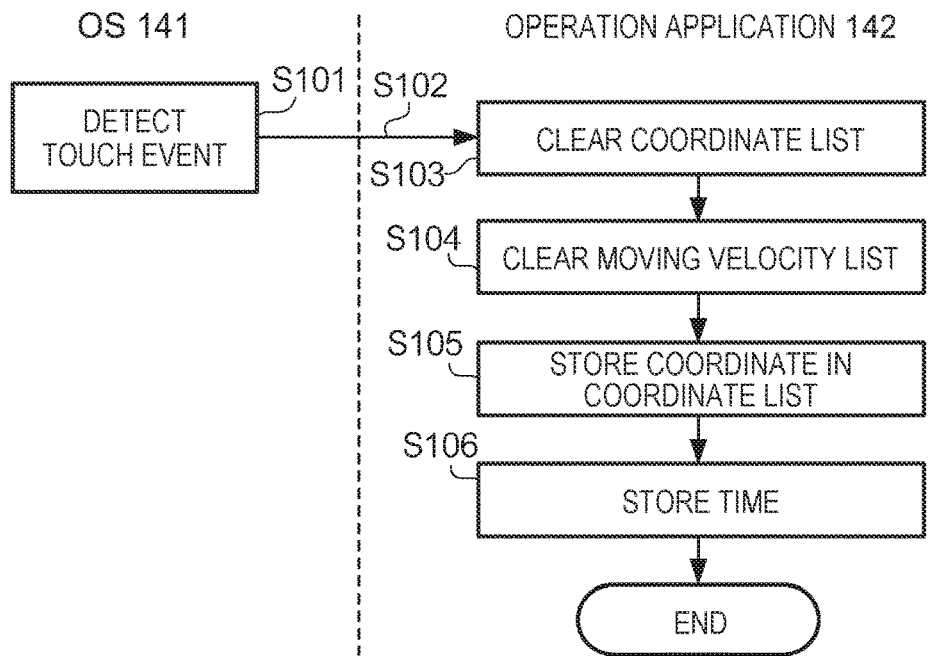
FIG. 7 is a flowchart showing the command transmission process according to the embodiment in the case in which a touch event has been detected.
FIG. 8 is a diagram showing a configuration of a coordinate list and a velocity list according to the embodiment.

FIG. 7 is a flowchart showing the command transmission process performed in the CPU 11A in the case in which the touch event has been detected. FIG. 8 is a diagram showing a configuration of a coordinate list and a velocity list stored in the RAM 11C.

In the CPU 11A, when the OS 141 detects the touch event in the operation area Op (step S101), the operation application 142 is notified of the coordinate of the position thus detected (step S102). In the CPU 11A, the operation application 142 clears the coordinate list stored in the RAM 11C when the operation application 142 receives the notification of the coordinate (step S103). As shown in FIG. 8, the coordinate list is a list for storing the coordinate of the position in the touch panel 12 and the time at which the position has been detected, which are notified of by the OS 141, so as to be associated with each other. Due to the process in the step S103, the coordinate list becomes empty.

Then, the operation application 142 clears the moving velocity list stored in the RAM 11C (step S104). The moving velocity list is a list storing the moving velocity of the finger identified in a time-series order. In the moving velocity list, it is also possible for the moving velocity to be associated with the time at which the moving velocity has been identified. Due to the process in the step S104, the moving velocity list becomes empty.

Then, the operation application 142 stores the coordinate having been notified of in the step S102 in the coordinate list (step S105). Then, the operation application 142 stores the time in the coordinate list so as to be associated with the coordinate stored in the step S105 (step S106). The time denotes the time at which the touch event has been detected, but the time at which the notification in the step S102 has been received, or the time at which the coordinate has been stored in the step S105 has been stored can also be used.

The operation application 142 performs the processing steps of the steps S103 through S106 every time the touch event is detected in the OS 141.

Figure 9:
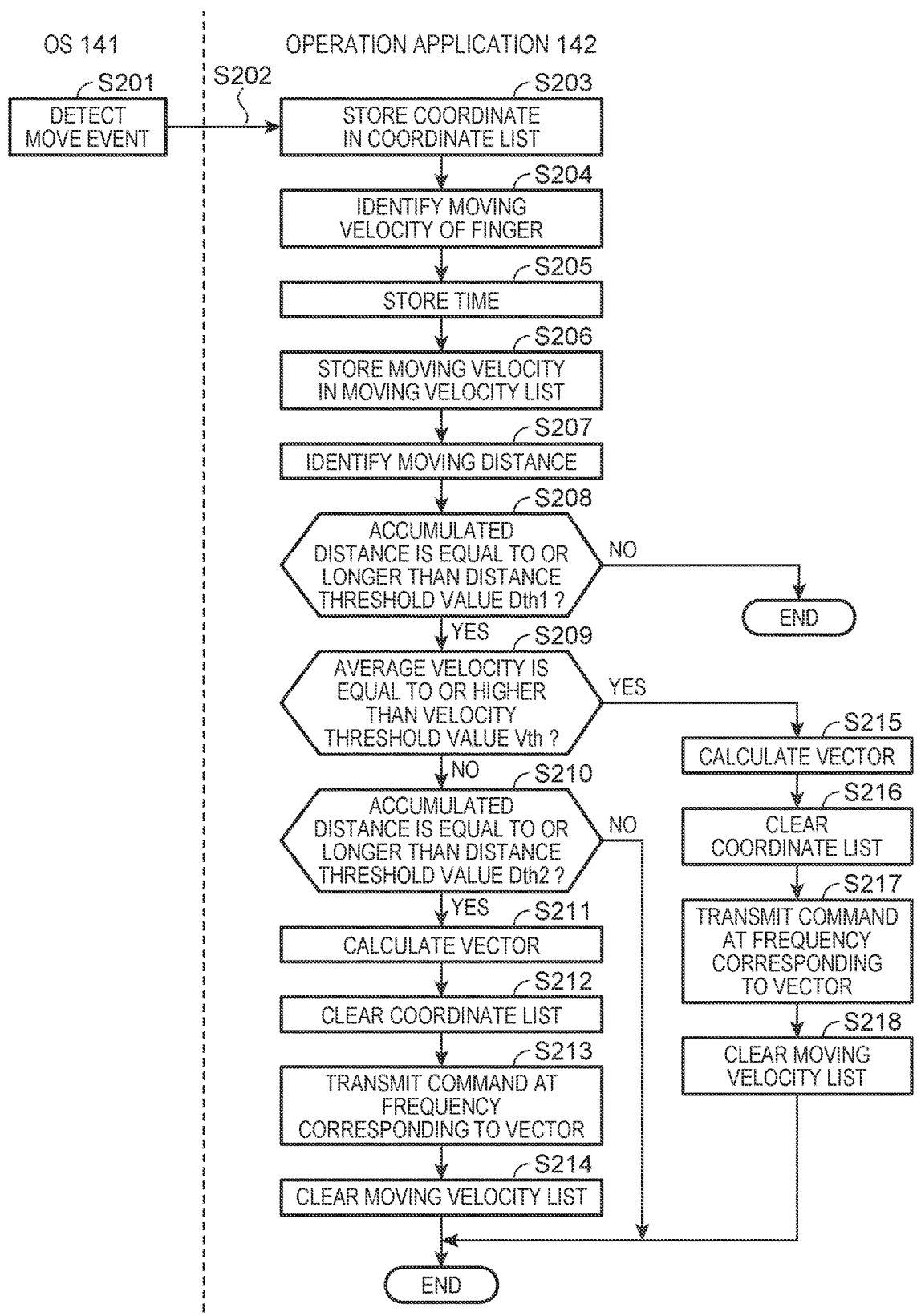
FIG. 9 is a flowchart showing the command transmission process according to the embodiment in the case in which a move event has been detected.

FIG. 9 is a flowchart showing the command transmission process performed in the CPU 11A in the case in which the move event has been detected. FIG. 10 is a diagram for explaining a method for identifying the moving velocity and the moving distance. FIG. 11 is a diagram for describing a relationship between the content of the swipe operation and the command to be transmitted. FIG. 12 is a diagram showing variations in the picture displayed by the projector 20. In advance of the following actions, it is assumed that the picture SC shown in FIG. 6(A) is displayed. The swipe operation described below is assumed as a swipe operation in the vertical direction.

In the CPU 11A, when the OS 141 detects the move event in the operation area Op (step S201), the operation application 142 is notified of the coordinate of the position thus detected (step S202). In the CPU 11A, the operation application 142 stores (step S203) the coordinate having been notified of in the step S202 in addition to the coordinate list. Then, the operation application 142 identifies the moving velocity of the finger of the user in the swipe operation based on the coordinate list (step S204). As shown in FIG. 10(A), it is assumed that the coordinate (xk−1, yk−1) has been notified of at the time t=tk−1 (k is a natural number), and the coordinate (xk, yk) has been notified of at the time t=tk subsequent to the time t=tk−1 in the time-series order. In this case, the operation application 142 obtains the moving velocity vk−1 based on the distance between the two positions represented by (xk−1, yk−1) and (xk, yk) and the difference tk−(tk−1) between the times at which the two positions have respectively been detected.

Then, the operation application 142 stores the time in addition to the coordinate list so as to be associated with the coordinate stored in the step S203 (step S205). Then, the operation application 142 stores the moving velocity identified in the step S204 in addition to the moving velocity list (step S206). The operation application 142 identifies the accumulated moving distance of the finger after transmitting the latest command as an accumulated distance based on the coordinates stored in the coordinate list (step S207). The accumulate distance is represented by "L". The accumulated distance L is the length of a path along which the finger has moved in the state of having contact with the touch panel 12.

Figure 12A:
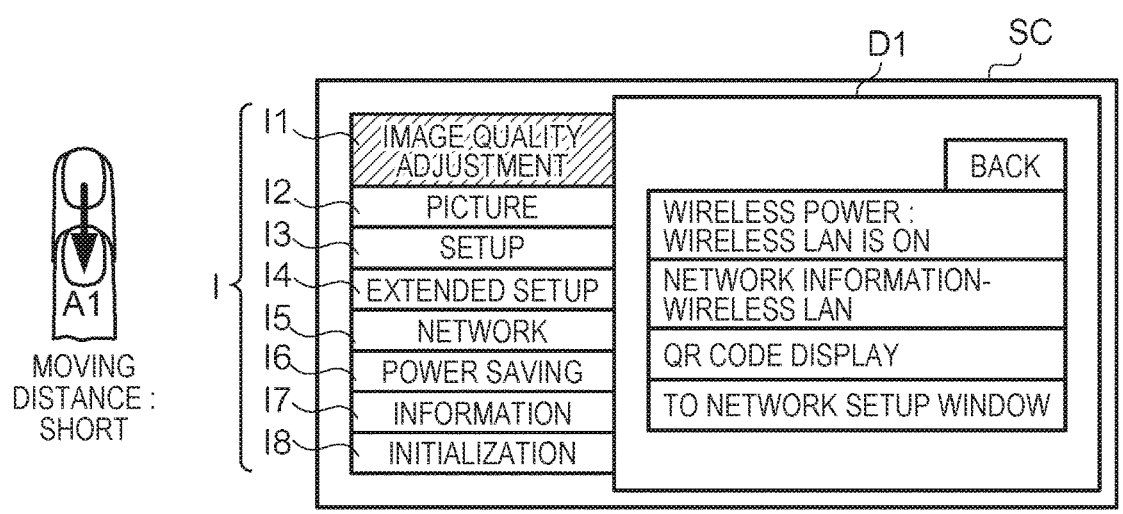
FIG. 12 is a diagram showing variations in the picture displayed by the projector according to the embodiment.

Then, the operation application 142 determines whether or not the accumulated distance L is equal to or longer than a distance threshold value Dth1 (step S208). The distance threshold value Dth1 represents the minimum required moving distance of the finger for transmitting the command to the projector 20. The distance threshold value Dth1 is determined in advance, for example. In the case in which "NO" has been determined in the step S208, the operation application 142 terminates the process corresponding to one move event without transmitting the direction indication command as shown in FIG. 11. As describe above, in the case in which the moving distance of the finger in the swipe operation is relatively short as shown in FIG. 12(A), the projector 20 keeps the item I1 selected.

In the case in which "YES" has been determined in the step S208, the operation application 142 determines whether or not an average velocity Va is equal to or higher than a velocity threshold value Vth (step S209). The average velocity Va is an average moving velocity of the finger from when the latest command has been transmitted to the present. The operation application 142 calculates an average value of the moving velocity stored in the moving velocity list as the average velocity Va. The velocity threshold value Vth is a value determined in advance, for example, and corresponds to a first velocity or a second velocity according to the invention.

In the case in which "NO" has been determined in the step S209, namely in the case in which the average velocity Va is lower than the velocity threshold value Vth, the operation application 142 determines whether or not the accumulated distance L is equal to or longer than a distance threshold value Dth2 (step S210). The distance threshold value Dth2 represents a distance longer than the distance threshold value Dth1. The distance threshold value Dth2 represents the minimum required moving distance of the finger for transmitting the command in the case in which the average velocity Va is relatively low. The distance threshold value Dth2 is determined in advance, for example. In the case in which "YES" has been determined in the step S210, the operation application 142 calculates a vector Ve based on the coordinate list (step S211). As shown in FIG. 10(B), the vector Ve is identified by the accumulated distance L and the direction in which the finger has moved. In other words, the vector Ve represents the moving distance and the moving direction of the finger in one swipe operation.

Figure 12B:
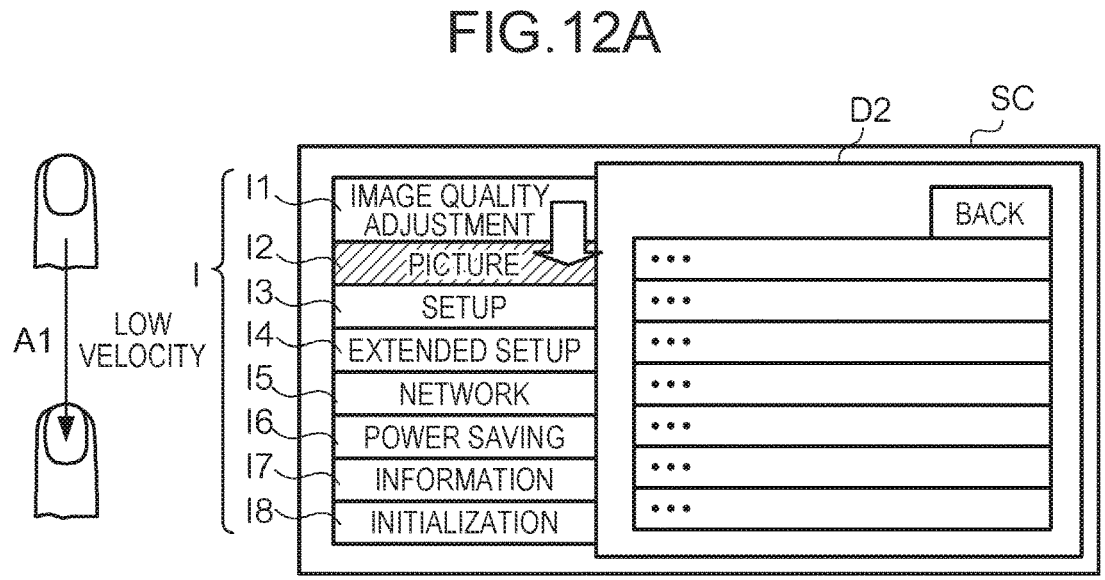

Then, the operation application 142 clears the coordinate list (step S212). Then, the operation application 142 transmits a command to the projector 20 at a frequency corresponding to the vector calculated in the step S211 (step S213). Here, the operation application 142 transmits the direction indication command once to the projector 20 since the average velocity Va is lower than the velocity threshold value Vth, and the accumulated distance L is equal to or longer than the distance threshold value Dth2 as shown in FIG. 11. As described above, in the case in which the moving distance of the finger in the swipe operation is relatively long and the moving velocity is relatively low as shown in FIG. 12(B), the projector 20 changes the item to be selected to the next item, and thus selects the item I2 here. In the example shown in FIG. 12(B), the menu area D2 related to the item I2 is displayed. Then, the operation application 142 clears the moving velocity list (step S214).

In the case in which "NO" has been determined in the step S210, namely the case in which the accumulated distance L is shorter than the distance threshold value Dth2, the operation application 142 terminates the process corresponding to one move event without transmitting the direction indication command as shown in FIG. 11. As described above, in the case in which the moving distance of the finger in the swipe operation is relatively short as shown in FIG. 12(A), the projector 20 keeps the item I1 selected.

Figure 12C:
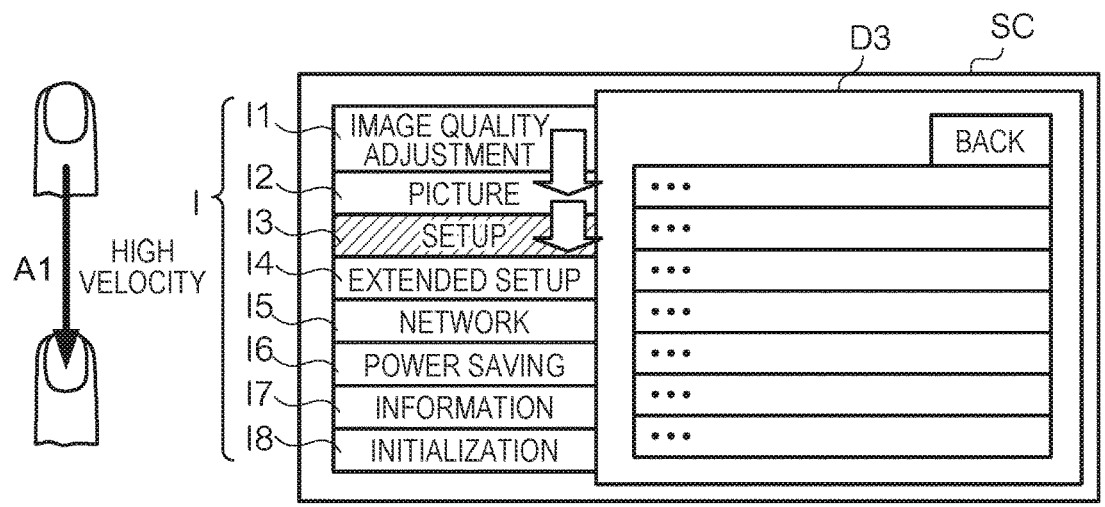

In the case in which "YES" has been determined in the step S209, the operation application 142 calculates the vector Ve based on the coordinate list (step S215). The calculation of the vector can be the same as in the step S211. Then, the operation application 142 clears (step S216) the coordinate list. Then, the operation application 142 transmits (step S217) a command to the projector 20 at a frequency corresponding to the vector. The operation application 142 transmits the direction indication command twice to the projector 20 since the moving velocity is equal to or higher than the velocity threshold value Vth, and the accumulated distance L is equal to or longer than the distance threshold value Dth1 as shown in FIG. 11. Therefore, in the case in which the moving velocity of the finger in the swipe operation is relatively high as shown in FIG. 12(C), the projector 20 changes the item to be selected to the item located next to the next item, and thus selects the item I3 here. In the example shown in FIG. 12(C), the menu area D3 related to the item I3 is displayed. Then, the operation application 142 clears (step S218) the moving velocity list.

In the case of further changing the item to be selected, the user newly swipes the surface of the operation area Op with the finger. In the control device 10, since the next direction indication command is transmitted in the case in which the accumulated distance after transmitting one direction indication command is equal to or longer than the distance threshold value Dth1, it is easy for the user to figure out the fact that the intended control has been performed.

Then, when the operation application 142 detects a rightward swipe operation, the operation application 142 transmits the determination instruction command to the projector 20. The conditions of the accumulated distance in the swipe operation in this case do not particularly matter, and the accumulated distance can be equal to or different from, for example, the distance threshold value Dth1.

As described above, the operation application 142 varies the frequency of the transmission of the direction indication command in accordance with the moving velocity and the moving distance of the finger in the swipe operation. In particular, in the case in which the moving velocity of the finger is relatively high, the operation application 142 transmits the direction indication command twice in accordance with one swipe operation. As described above, in the case in which the moving velocity of the finger is higher than the first velocity, the operation application 142 sets the frequency of the transmission of the command higher compared to the case in which the moving velocity of the finger is lower than the first velocity. Therefore, in the case in which the user wants to significantly change the selection of the item to be selected, it is sufficient for the user to perform the swipe operation at high speed with the finger. Therefore, the operation load of the user decreases and the operation time is also reduced compared to the case in which the command is always transmitted once with respect to one swipe operation.

It should be noted that in the related-art remote controller, the commands are transmitted in series when the same key is held down continuously. However, in this case, in order for the user to determine the continuation of holding down of the key, a certain time is required from the transmission of the first command to the transmission of the next command. In contrast, according to the control device 10 related to the present embodiment, since the commands are immediately transmitted in series in accordance with the user performing the swipe operation with the finger at high speed, the time for the user operation is reduced.

Further, in the case in which the moving velocity is relatively low, if the accumulated distance is relatively long, the operation application 142 transmits the direction indication command once in accordance with one swipe operation. As described above, in the case in which the moving velocity of the finger is lower than the second velocity, the operation application 142 sets the frequency of the transmission of the command lower compared to the case in which the moving velocity of the finger is higher than the second velocity. Therefore, it is sufficient for the user to move the finger slowly in the case of changing the item to be selected to the next item. Even in the case in which, for example, the accumulated distance in the swipe operation is long, since the direction indication command is not transmitted more than two times, the operation load of the user for changing the item to be selected to the next item decreases.

Modified Examples

The invention can be implemented in some configurations different from the embodiment described above. Further, it is also possible to arbitrarily combine the modified examples described below with each other.

The relationship between the moving velocity and the moving distance of the finger, and the frequency of the transmission of the direction indication command is not limited to the example described in FIG. 11. Further, the relationship between the direction of the swipe operation and the type of the command to be transmitted is not limited either to the example described with reference to FIG. 11.

Further, the threshold value corresponding to the velocity threshold value Vth or the distance threshold value Dth2 can further be divided into two or more levels. In this case, it is possible for the operation application 142 to classify the frequency of the transmission of the command into a larger number of levels to transmit the corresponding commands. As the number of levels of the threshold value increases, the frequency of the transmission of the command varies in a relationship closer to the linear relationship in accordance with the moving velocity and the moving distance of the finger of the user.

Although in the embodiment described above, there is explained the case in which the command is transmitted in accordance with the moving velocity and the moving distance of the finger of the user, it is also possible to assume that the command is transmitted again in the case in which the accumulated moving distance from when transmitting the command is equal to or longer than a specific threshold value without using the moving velocity. By adopting such a configuration, it is possible for the user to make a series of commands transmit with one swipe operation without looking at the touch panel 12, and further, the command is transmitted a corresponding (e.g., proportional) number of times to the length of the path on which the finger has moved. Therefore, the operability is improved.

It is not required for the operation application 142 to be an application program for performing the command transmission process for selecting either one of the items arranged in a line as described with reference to FIGS. 6(A) and 6(D). In the case of, for example, selecting either one of the parameters of the respective levels, it is also possible for the operation application 142 to perform the command transmission process described above. As the parameters, there can be cited a volume of a sound output, and parameters for designating the image processing such as a keystone distortion correction in the projector 20.

FIG. 13 is a diagram for describing a command transmission process different from that of the embodiment described above. Here, it is assumed that the frequency of the transmission of the command differs in accordance with the moving velocity of the finger in the swipe operation in the arrow A2 direction.

There is considered the case in which an image Mt of a meter visually expressing the current value of the parameter, an operator image B10 for varying the parameter in the descending direction, and an operator image B20 for varying the parameter in the ascending direction are displayed using the touch panel 12 as shown in FIG. 13(A). In this case, the operation application 142 transmits a command once so as to decrease the parameter as much as "1" when the tap operation to the operator image B10 is detected, and transmits a command once so as to increase the parameter as much as "1" when the tap operation to the operator image B20 is detected.

In the case in which the average velocity Va of the swipe operation in the arrow A2 direction is equal to or higher than the velocity threshold value Vth as shown in FIG. 13(B), the operation application 142 transmits the command 5 times so as to increase the parameter as much as "5". Although not shown in the drawings, in the case of the leftward swipe operation, the operation application 142 transmits the command five times so as to decrease the parameter as much as "5". In contrast, in the case in which the average velocity Va of the swipe operation in the arrow A2 direction is lower than the velocity threshold value Vth, and the accumulated distance L is equal to or longer than the distance threshold value Dth2 as shown in FIG. 13(C), the operation application 142 transmits the command once so as to increase the parameter as much as "1". Although not shown in the drawings, in the case of the leftward swipe operation, the operation application 142 transmits the command once so as to decrease the parameter as much as "1". In this case, due to the function of the operation application 142, the operability in the case of designating the parameter using the swipe operation is also improved.

It should be noted that it is also possible to omit the operator images B10, B20 described in FIG. 13. Further, the operation application 142 is not limited to changing the item to be selected and varying the parameter, but can transmit a command for, for example, displaying a picture after scrolling the picture.

It is also possible for the operation application 142 to display a remote operation picture R6 shown in FIG. 14 instead of the remote operation picture R5. While displaying the remote operation picture R6, the touch panel 12 includes an area K where operator images K1 through K4 for respectively indicating leftward, rightward, upward, and downward directions are disposed in addition to an area where the operator images B5, B6 are disposed. The area K is disposed separately from the operation area Op. In the case in which the tap operation to either of the operator images K1 through K4 is detected, the operation application 142 transmits the direction indication command, which corresponds to the operator image corresponding to the tap operation, once every time the tap operation is detected.

According to this modified example, in the case of performing the operation for indicating the direction, it is possible for the user to selectively use the operation using the operator images K1 through K4 and the operation using the operation area Op.

Further, the area where the operators are disposed is not limited to the area where the operator images are displayed, but can also be an area where the operators physically provided to the control device 10 exist.

Further, the operation area according to the invention is not limited to the area overlapping the display area, but can also be an operation area, which is formed of, for example, a touch pad, and is disposed at a different position from the display area.

It is also possible to eliminate a part of the configuration or the operation of the display system 1 according to the embodiment described above.

For example, the operation application 142 can determine the frequency of the transmission of the command in accordance with the moving velocity of the finger irrespective of the direction of the swipe operation. This configuration is adopted in the case in which, for example, the direction of changing the item to be selected or the direction of varying the parameter is one direction, or in the case in which the direction is indicated by a different method. Further, the operation application 142 can determine the frequency of the transmission of the command based on the moving velocity of the finger irrespective of the moving distance of the finger.

The control device 10 can be connected to the projector 20 not wirelessly but in a wired manner. Further, the control device according to the invention is not limited to the device for controlling the external electronic apparatus with a remote operation, but can also be a device incorporated in the electronic apparatus as a control target.

The pictures displayed by the control device 10 or the projector 20, the types of the items, the content of the control, the values of the variety of parameters explained in the above description of the embodiment are illustrative only.

The electronic apparatus according to the invention is not limited to the projector. The electronic apparatus according to the invention can also be a monitor direct-viewing display device such as a liquid crystal display or a television. Further, the electronic apparatus according to the invention can also be an electronic apparatus other than the display device, and can also be other electronic apparatuses to be a control target using a remote operation such as a recording device like a hard disk recorder or audio equipment.

In the embodiment described above, each of the functions realized by the control device 10 can be realized by a combination of a plurality of programs, or can be realized by a combination of a plurality of hardware resources. Further, in the case in which the function of the control device 10 is realized using a program, the program can be provided in a state of being stored in a computer readable recording medium such as a magnetic recording medium (e.g., a magnetic tape, a magnetic disk (HDD (Hard Disk Drive), FD (Flexible Disk)), an optical recording medium (e.g., an optical disk), a magneto-optical recording medium, or a semiconductor memory, or can also be delivered via a network. Further, the invention can also be figured out as a method of controlling an electronic apparatus.

REFERENCE SIGNS LIST

1 . . . display system
10 . . . control device
11 . . . control section

11A . . . CPU
11B . . . ROM
11C . . . RAM
111 . . . moving velocity identification section
112 . . . vector calculation section
112A . . . moving distance identification section
112B . . . moving direction identification section
113 . . . command transmission section
12 . . . touch panel
12A . . . display surface
13 . . . wireless communication section
14 . . . storage section
141 . . . OS
142 . . . operation application
20 . . . projector

The invention claimed is:

1. A control device adapted to control an electronic apparatus that displays a plurality of items, comprising:
a display adapted to display an operation area in which an operation is detected, the operation area displaying elements that are different from the plurality of items displayed on the electronic apparatus and the operation area being in a separate area from the plurality of items displayed on the electronic apparatus;
a position detection sensor adapted to repeatedly detect a position on the operation area pointed with a pointer;
a processor configured to operate:
a moving velocity identification program adapted to identify a moving velocity of the pointer based on the plurality of positions detected; and
a command transmission program adapted to transmit a predetermined command used to change a selection from a selected item of the plurality of items to another item adjacent to the selected item to the electronic apparatus at a degree of repetition corresponding to the moving velocity identified.

2. The control device according to claim 1, further comprising:
a moving distance identification section adapted to identify a moving distance of the pointer based on the plurality of positions detected,
wherein the command transmission section transmits the command at a frequency corresponding to the moving velocity identified and the moving distance identified.

3. The control device according to claim 2, wherein
the command transmission section transmits the command again in a case in which the moving distance accumulated from when transmitting one of the commands is equal to or longer than a threshold value.

4. The control device according to claim 1, wherein
the frequency is set higher in a case in which the moving velocity is higher than a first velocity compared to a case in which the moving velocity is lower than the first velocity.

5. The control device according to claim 1, wherein
the frequency is set lower in a case in which the moving velocity is lower than a second velocity compared to a case in which the moving velocity is higher than the second velocity.

6. The control device according to claim 1, further comprising:
a moving direction identification section adapted to identify a moving direction of the pointer based on the positions detected,
wherein the command transmission section transmits the command of a type corresponding to the moving direction identified.

7. The control device according to claim 6, wherein
the command transmission section transmits the command adapted to indicate a direction corresponding to the moving direction identified.

8. The control device according to claim 1, wherein
the operation area is separately disposed from an area where an operator used to control the electronic apparatus is disposed.

9. A method of controlling an electronic apparatus that displays a plurality of items, comprising:
a step of displaying an operation area in which an operation is detected, the operation area being in a separate area from the plurality of items;
a step of identifying a moving velocity of a pointer, when a plurality of positions on an operation area pointed with the pointer is notified of, based on the plurality of positions notified of; and
a step of transmitting a predetermined command used to change the selection from selected one of the plurality of items to an item adjacent to the selected item to the electronic apparatus at a frequency corresponding to the moving velocity identified.

10. A non-transitory computer-readable recording medium storing a program which can be executed by a computer adapted to control an electronic apparatus that displays a plurality of items, the program making the computer execute a process comprising:
a step of displaying an operation area in which an operation is detected, the operation area being in a separate area from the plurality of items;
a step of identifying a moving velocity of a pointer, when a plurality of positions on an operation area pointed with the pointer and detected repeatedly is notified of, based on the plurality of positions notified of; and
a step of transmitting a predetermined command used to change the selection from selected one of the plurality of items to an item adjacent to the selected item to the electronic apparatus at a frequency corresponding to the moving velocity identified.

11. A control device adapted to control an electronic apparatus that displays a plurality of items, comprising:
a display section adapted to display an operation area in which an operation is detected, the operation area being in a separate area from the plurality of items;
a position detection section adapted to repeatedly detect a position on the operation area pointed with a pointer;
a moving velocity identification section adapted to identify a moving velocity of the pointer based on the plurality of positions detected; and
a command transmission section adapted to transmit a predetermined command used to change the selection from selected one of the plurality of items to an item adjacent to the selected item to the electronic apparatus at a frequency corresponding to the moving velocity identified,
wherein the command transmission section transmits the command again in a case in which the moving distance accumulated from when transmitting one of the commands is equal to or longer than a threshold value.

12. The control device according to claim 1, wherein the control device is separate from the electronic apparatus.

13. The control device according to claim 1, wherein display is configured to display a first display image that includes the operation area, the first display image being different from a second display image that includes the plurality of items displayed on the electronic apparatus.

\* \* \* \* \*